US012734537B2

(12) United States Patent
Lee

(10) Patent No.: US 12,734,537 B2
(45) Date of Patent: Sep. 15, 2026

(54) LIQUID CONTENTS EJECTION CONTAINER HAVING NOZZLE BLOCKING STRUCTURE

(71) Applicant: PUM-TECH KOREA CO., LTD, Incheon (KR)

(72) Inventor: Do Hoon Lee, Incheon (KR)

(73) Assignee: PUM-TECH KOREA CO., LTD, Incheon (KR)

( * ) Notice: Subject to any disclaimer, the term of this patent is extended or adjusted under 35 U.S.C. 154(b) by 116 days.

(21) Appl. No.: 18/728,821

(22) PCT Filed: Jan. 18, 2023

(86) PCT No.: PCT/KR2023/000849
§ 371 (c)(1),
(2) Date: Jul. 12, 2024

(87) PCT Pub. No.: WO2023/153665
PCT Pub. Date: Aug. 17, 2023

(65) Prior Publication Data

US 2025/0099996 A1 Mar. 27, 2025

(30) Foreign Application Priority Data

Feb. 9, 2022 (KR) ........................ 10-2022-0016956

(51) Int. Cl.
*B05B 11/10* (2023.01)
*B05B 1/00* (2006.01)

(52) U.S. Cl.
CPC ............ *B05B 11/1059* (2023.01); *B05B 1/00* (2013.01)

(58) Field of Classification Search
CPC ... B05B 11/1059; B05B 1/00; B05B 11/0064; B05B 11/0072; B05B 11/0038;
(Continued)

(56) References Cited

U.S. PATENT DOCUMENTS 2,550,356 A * 4/1951 Jarvis ................. B65D 47/2075 264/DIG. 70
2,555,803 A * 6/1951 Mashinter ............... B05B 1/323 239/533.1

(Continued)

FOREIGN PATENT DOCUMENTS

JP H0535715 U * 5/1993
KR 10-2012-0017628 A 2/2012

(Continued)

*Primary Examiner* — Bob Zadeh
(74) *Attorney, Agent, or Firm* — Heedong Chae; Lucem, PC

(57) ABSTRACT

A liquid contents ejection container having a nozzle blocking structure, according to an embodiment of the present invention, comprises: a container body in which liquid contents are stored; an ejection means connected to the container body so as to eject the liquid contents; a push button which is connected to the ejection means so as to operate the ejection means, and which has an ejection path formed therein; and a nozzle blocking means composed of a nozzle, which is coupled to one side of the push button and has an ejection hole, an elastic body, which is formed in the nozzle and is elastically deformed, and a nozzle valve, which opens/closes the ejection hole while moving back and forth by means of the elastic body, wherein the nozzle valve is spaced from the ejection hole so as to open the ejection hole while the elastic body is stretched outward from the inside of the nozzle, and the nozzle valve covers the ejection hole on the outer side thereof so as to close the ejection hole while the elastic body is restored.

8 Claims, 5 Drawing Sheets

(58) Field of Classification Search
CPC ............... B05B 11/026; B05B 11/1023; B05B 11/1069; B05B 11/0037; B05B 11/1077; A45D 2200/056; A45D 2200/057; A45D 34/04; B65D 47/2025; B65D 77/06
See application file for complete search history.

(56) References Cited

U.S. PATENT DOCUMENTS

| | | | | |
|---|---|---|---|---|
| 2007/0164053 | A1* | 7/2007 | Son | G01F 11/025<br>222/257 |
| 2011/0017779 | A1* | 1/2011 | Rossignol | B05B 11/1077<br>222/321.9 |
| 2018/0058685 | A1* | 3/2018 | Qiu | B05B 1/304 |
| 2024/0174430 | A1* | 5/2024 | Bradford | A61M 11/02 |
| 2025/0099996 | A1* | 3/2025 | Lee | B05B 11/1059 |

FOREIGN PATENT DOCUMENTS

| | | | | | |
|---|---|---|---|---|---|
| KR | 10-2012-0061258 | A | | 6/2012 | |
| KR | 10-2012-0073669 | A | | 7/2012 | |
| KR | 10-2012-0074733 | A | | 7/2012 | |
| KR | 10-2012-0083634 | A | | 7/2012 | |
| KR | 20120073669 | A | * | 7/2012 | B05B 1/02 |
| KR | 20130025022 | A | * | 3/2013 | A45D 34/00 |

* cited by examiner

LIQUID CONTENTS EJECTION CONTAINER HAVING NOZZLE BLOCKING STRUCTURE

TECHNICAL FIELD

One aspect of the present disclosure relates to a liquid contents ejection container, and more particularly, to a liquid contents ejection container having a nozzle blocking structure in which a nozzle valve coupled to an elastic body opens and closes a discharge port of a nozzle while the elastic body is deformed by a discharge pressure of liquid contents, so that sealing inside the nozzle and a restoring force of the elastic body are stably maintained.

BACKGROUND ART

In a recent modern society, both men and women of all ages use cosmetics upon needs in accordance with the rapid diversification trend of the times. In particular, women use cosmetic products and cosmetic tools with various types and various colors, and various high-quality cosmetic products and tools are being released into the market everyday through the research and development of cosmetics-related companies.

The cosmetics according to the purpose of use are classified into facial cleansing cosmetics used for removing sebum, wastes and contaminants on a surface of a skin, base cosmetics used for properly supplying moisture and oil to the skin, color cosmetics used for expressing beautiful colors, hair cosmetics used for protecting hairs and supplying nutrition as well as removing foreign substances from hairs or scalp, and perfumes obtained by dissolving fragrant materials in alcohol or the like and used for giving a fragrance to others.

Meanwhile, the cosmetics are manufactured from natural raw materials as interest in the stability of cosmetic compositions and the skin beauty are increased due to the improvement of living standards. However, since the above cosmetics do not add preservatives to minimize irritation to the skin, the above cosmetics have a relatively high risk of deterioration compared to cosmetics made from chemical raw materials. For example, the above cosmetics may be contaminated or deteriorated when bacteria permeate due to contact with external air during use or the composition is oxidated due to contact with the air.

In addition, containers having a simple opening and closing function have been generally used to store and use cosmetics in a liquid or gel form, such as lotions, creams, gels, shampoos, and hair conditioners, among the above cosmetics, and accordingly, the cosmetics are put from the containers by using a spatula or a finger and applied to the skin or hair. However, the above conventional containers fail to consistently control the amount of discharged cosmetics, and thus the cosmetics are wasted.

Accordingly, a pump-type cosmetic container, which minimizes contact between cosmetics and external air, is convenient to use, and consistently control discharge amounts of cosmetics, has been developed.

The pump-type cosmetic container includes a container body configured to accommodate contents; a pressurized pump provided in an opening of the container body and operated by pressing; and a nozzle head coupled to an upper portion of the container body while being connected to the pressurized pump, wherein the contents accommodated in the container body are discharged to the outside by a predetermined amount by the pumping operation of the pressurized pump when the nozzle head exposed to the outside is pressurized downward.

According to the above-described pump-type cosmetic container, the contents accommodated in the container body is prevented from coming into contact with outside air, it is economical because the contents are not excessively discharged through a discharge port of the nozzle, and it is convenient to use because the cosmetic container operates even when the container body is placed on the floor.

However, in the pump-type cosmetic container, since a discharge port for discharging the contents to the outside is always open, the discharged content may not be finished cleanly and flow downward from the nozzle, thereby causing a mess. In addition, the contents remaining in the discharge port and the ejection path may be exposed to the outside for a long period of time and hardened to block the discharge port or contaminate or deteriorate ingredients, thereby causing unhygienic conditions.

In order to solve the above-mentioned problems, a nozzle structure of a dispenser pump button is disclosed in Korean Unexamined Patent Publication No. 10-2012-0017628. According to the above related art, the nozzle structure coupled to a discharge portion of the dispenser pump button to discharge contents to the outside includes: an outer nozzle having a predetermined length to form a passage for moving the contents and having one side open to allow the contents to be introduced through the discharge portion and the other side formed with a discharge hole to allow the introduced contents to be discharged; and an inner nozzle accommodated inside the outer nozzle to open and close the outer nozzle according to forward and backward movement, and composed of a blocking rod for opening and closing the discharge hole, an elastic body coupled to an end of the blocking rod to move the blocking rod forward and backward, and an elastic body support portion coupled to an end of the elastic body to support the elastic body and formed with a content inlet hole. includes However, according to the related art, since the bellows-type elastic body is repeatedly compressed by the discharge pressure of the contents, the self-restoring power may be decreased when used for a long period of time. In addition, the related art may be unhygienic because the contents remaining inside the discharge hole of the outer nozzle may be pushed out by the blocking rod at the moment the blocking rod moves backward and then forward due to contraction and restoration of the elastic body subject to the discharge pressure of the contents, and accordingly, the area around the discharge hole may be dirty.

DOCUMENT OF RELATED ART

Patent Document (Patent Document 1) Korea Patent Publication No. 10-2012-0017628 (published on Feb. 29, 2012)

DISCLOSURE

Technical Problem

In order to solve the above conventional problems, an object of one aspect of the present disclosure is to provide a liquid contents ejection container having a nozzle blocking structure, in which a nozzle valve coupled to an elastic body opens and closes a discharge port of a nozzle from the outside while the elastic body is stretched and then restored by a discharge pressure of liquid contents, so that sealing inside the nozzle is stably maintained, and a restoring force is prevented from being deteriorated due to repeated compression of the elastic body.

Technical Solution

In order to achieve the above-mentioned object, one aspect of the present disclosure provides a liquid contents ejection container having a nozzle blocking structure, which includes: a container body in which liquid contents are stored; an ejection unit connected to the container body to eject the liquid contents; a push button connected to the ejection unit to operate the ejection unit, and formed therein with an ejection path; a nozzle coupled to one side of the push button and having an ejection hole; and a nozzle blocking unit composed of an elastic body formed inside the nozzle and elastically deformed, and a nozzle valve for opening/closing the ejection hole while being reciprocated by the elastic body, wherein the nozzle valve is spaced apart from the ejection hole to open the ejection hole while the elastic body is stretched outward from the inside of the nozzle, and the nozzle valve covers the ejection hole on an outer side thereof to close the ejection hole while the elastic body is restored.

In addition, the container body may include an inner container for containing the liquid contents therein and an outer container for surrounding an outer side of the inner container.

In addition, the container body may have one side further coupled to a shoulder in which a push button is straight movably coupled to the shoulder.

In addition, the ejection unit may include a pump for pumping the liquid contents stored in the container body.

In addition, the nozzle may have an inner circumference from which a locking step protrudes, and at least a part of the nozzle valve may be locked by the locking step, so that the nozzle valve may open and close the discharge port of the nozzle from the outside.

In addition, the elastic body may include a locking portion, an elastic portion extending from the locking portion and elastically deformed, and a coupling portion formed at an end of the elastic portion and coupled to the nozzle valve.

In addition, the locking portion may have a ring shape and be locked and fixed to one end of the nozzle.

In addition, the elastic portion may have a cylindrical screw shape in which at least one line is wound in parallel at predetermined angle around an imaginary axis passing through the locking portion and the coupling portion.

In addition, the coupling portion may include coupling ring formed at a center thereof with a hole to which the nozzle valve is coupled, and at least one connecting rib for connecting the coupling ring to the elastic portion at a predetermined interval.

In addition, the nozzle valve may include a central shaft inserted into an inner space of the nozzle so as to be coupled to the elastic body, and a valve plate extending outward from the central shaft to open and close the discharge port of the nozzle.

Advantageous Effects

According to the embodiment of the present disclosure, the nozzle valve coupled to the elastic body opens and closes the discharge port of the nozzle while the elastic body is stretched and then restored by a discharge pressure of liquid contents, so that sealing inside the nozzle can be stably maintained, and a restoring force can be prevented from being deteriorated due to repeated compression of the elastic body.

According to the embodiment of the present disclosure, the nozzle valve reciprocating together with the elastic body opens and closes the nozzle discharge port from the outside, to stably block contact between the liquid contents and the external air so that the liquid contents can be prevented from being contaminated and deteriorated, and prevent the liquid contents from being partially leaked out of the nozzle during the operation process so that the liquid contents can be used hygienically.

According to the embodiment of the present disclosure, the elastic body installed in the inner space of the nozzle includes the locking portion, the elastic portion and the coupling portion, and the nozzle valve is inserted into the discharge port of the nozzle and easily fitted to the coupling portion, so that the assembly process of the liquid content discharge container can be simplified and manufacturing costs can be reduced, thereby improving productivity.

BEST MODE

Mode for Invention

Figure 1:
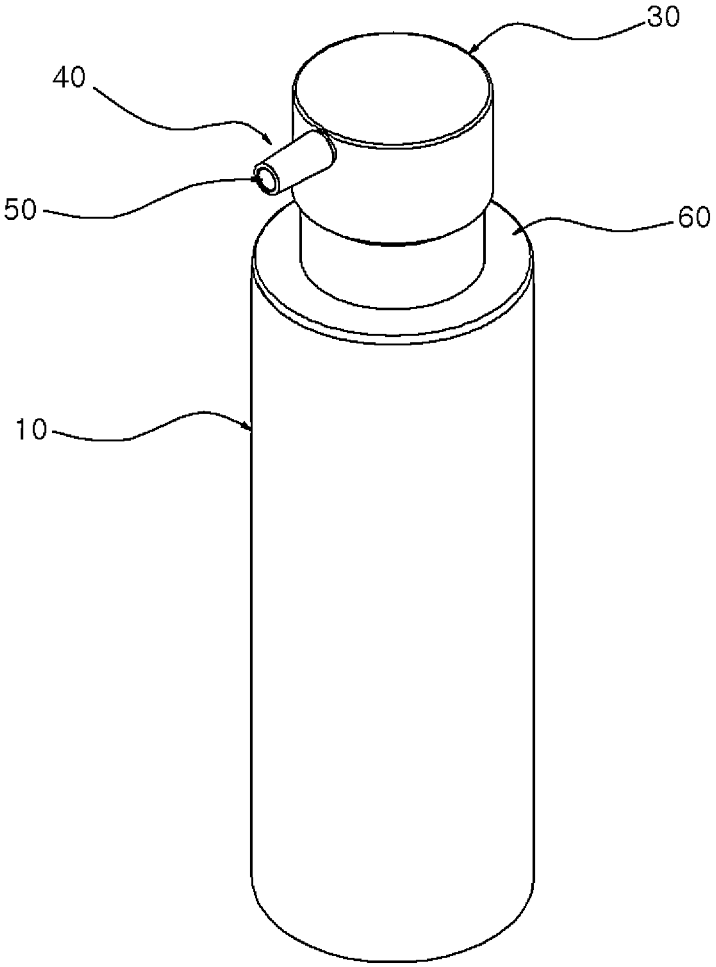
FIG. 1 is a perspective view showing a liquid contents ejection container according to the embodiments of one aspect of the present disclosure.

Hereinafter, the detailed descriptions of the present disclosure are embodiments for carrying out the present disclosure, and the corresponding embodiment refers to the accompanying drawings as an example. The embodiments will be described in detail to enable those skilled in the art to carry out the present disclosure. It is apparent to be understood that the various embodiments of the present disclosure may be different from each other but do not need to be mutually exclusive. For example, the particular shapes, structures, and features described herein may be embodied in other embodiments without departing from the idea and scope of the present disclosure in connection with an embodiment. In addition, it will be understood that the location or arrangement of an individual element within each disclosed embodiment may be modified without departing from the idea and scope of the present disclosure.

Accordingly, the detailed description set forth below is not intended to be taken in a limiting sense, and the scope of the present disclosure is limited only by the appended claims, along with the full scope of equivalents to which the claims are entitled, if properly described. Similar reference numerals in the drawings refer to the same or similar function throughout several aspects.

General term which is widely used recently has been selected in the present disclosure in consideration of the function according to the present disclosure as possible, but this may vary depending on the intention of those skilled in the art, precedents, the emergence of new technology or the like. In certain cases, the term may be arbitrarily selected by the applicant, and in this case, the meaning thereof will be described in detail in the relevant description of the invention. Therefore, the term used in the present disclosure will be defined based on the meaning of the term and contents throughout the present disclosure, not simply on the name of the term.

In the present disclosure, when one component "includes" some elements, it does not exclude other elements, but may further include the other elements, unless particularly stated otherwise.

Hereinafter, a liquid contents ejection container having a nozzle blocking structure according to the embodiments of the present disclosure will be described in detail with reference to the accompanying drawings.

Figure 2:
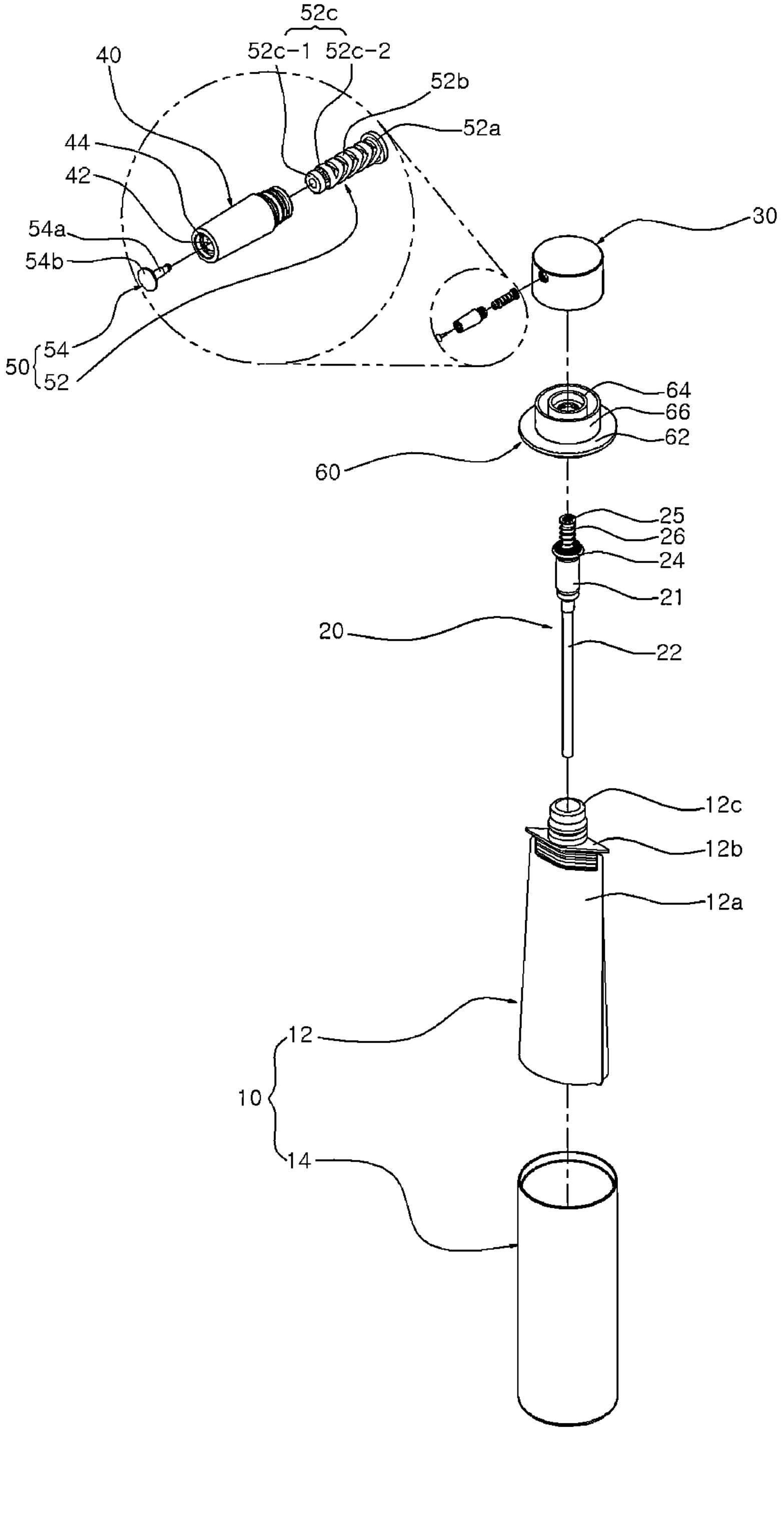
FIG. 2 is an exploded perspective view showing the liquid contents ejection container according to the embodiments of one aspect of the present disclosure.
Figure 3:
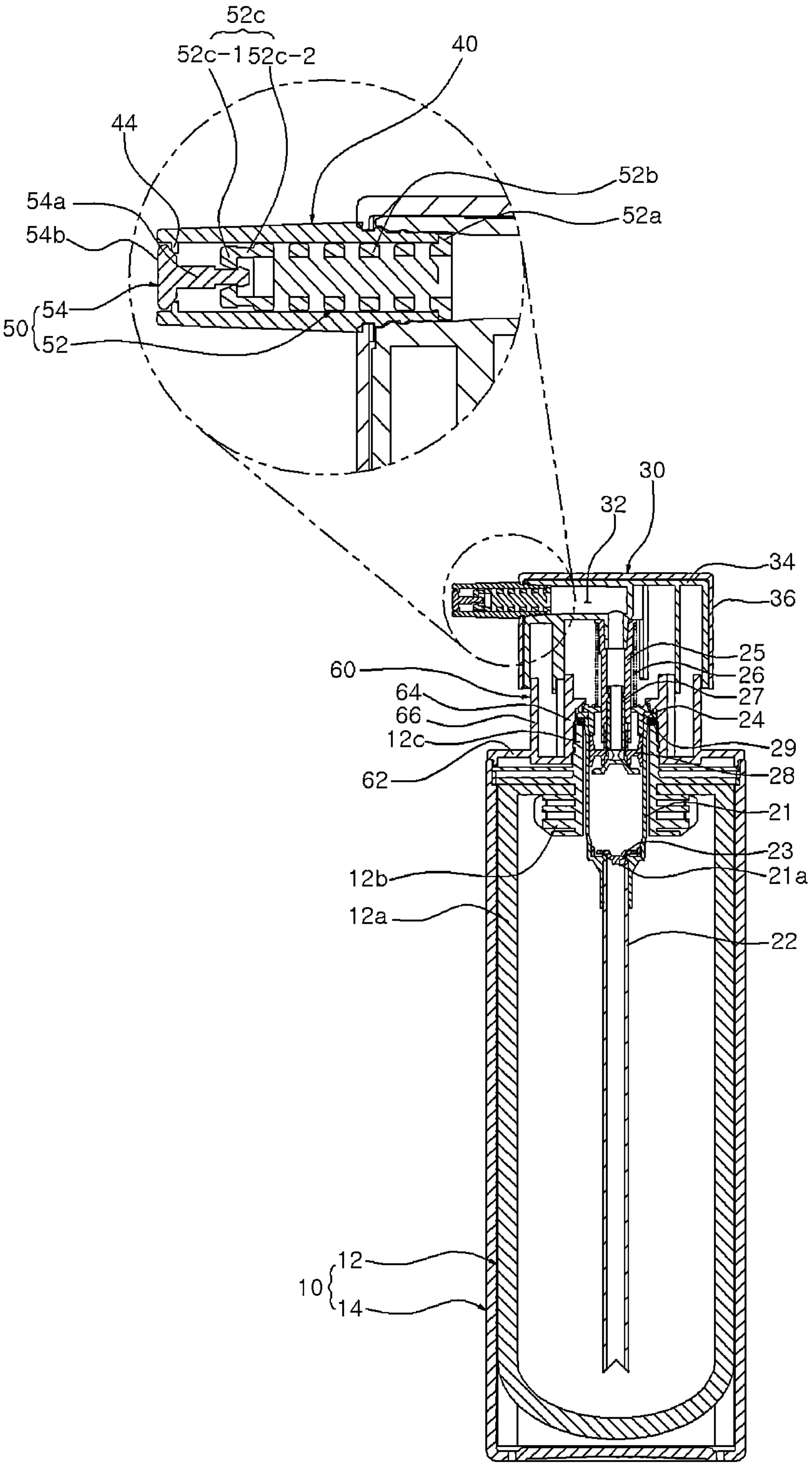
FIG. 3 is a sectional view showing the liquid contents ejection container according to the embodiments of one aspect of the present disclosure.

FIG. 1 is a perspective view showing a liquid contents ejection container according to the embodiments of the present disclosure, FIG. 2 is an exploded perspective view showing the liquid contents ejection container according to the embodiments of the present disclosure, and FIG. 3 is a sectional view showing the liquid contents ejection container according to the embodiments of the present disclosure.

As shown in the drawing, the liquid contents ejection container having a nozzle blocking structure according to the embodiments of the present disclosure may include a container body 10, an ejection unit 20, a push button 30, a nozzle 40, and a nozzle blocking unit 50.

Hereinafter, the liquid contents ejection container having a nozzle blocking structure according to the embodiments of the present disclosure will be described separately for each component as follows.

The container body 10 may be composed of an inner container 12 in which liquid contents are accommodated in an internal space thereof and an outer container 14 into which the inner container 12 is inserted.

The inner container 12 refers to a storage container for storing liquid contents therein, and has an inside maintained in a vacuum state to safely store the liquid contents. The liquid contents may include any content in a liquid or gel state, such as cosmetics, shampoo, or soap. The inner container 12 is formed of an oxygen blocking material or an aluminum material, and particularly, may be preferably formed of polyketone (a new material formed by combining carbon monoxide, ethylene, and propylene, as one of the high-performance thermoplastic polymers with low oxygen permeability) or Pokal (a new material formed by mixing polyketone with EVOH in the predetermined ratio to improve humidity resistance and flexibility).

As shown in FIG. 2, the inner container 12 may include a soft receiving portion 12*a* for accommodating the liquid contents therein, and a hard coupling portion 12*b* joined to the receiving portion 12*a*. An inlet portion 12*c* through which the liquid contents are injected is formed on one side of the coupling portion 12*b*, and at least a part of the ejection unit 20 is inserted and installed in the inlet portion 12*c*. The inner container 12 may be formed as a pouch container having shape changes as the liquid contents accommodated therein are exhausted, and, in addition thereto, may be formed in various types such as a general vacuum container, a single container for a dip tube, and a brow or glass container.

The outer container 14 protects the inner container 12 while surrounding an outer side of the inner container 12. The outer container 14 has a hard cylindrical shape with one side open, and defines an appearance of the container for discharging liquid contents. The outer container 14 is not limited to the cylindrical shape, and may be formed in various shapes or materials, taking into consideration the type of contents stored therein, usability, design elements, and the like. However, it may be desirable that the outer container 14 is narrow in width and relatively long in length, and has a gently bottom so as to be easily gripped by using a hand of a user and easily stood on the floor.

Meanwhile, a shoulder 60 may be further coupled to the one side of the outer container 14 of the container body 10. The shoulder 60 blocks the open part of the external container 14 and protects the ejection unit 20 installed in the container body 10, and a push button 30 may be straight movably coupled to the shoulder 60. The shoulder 60 includes a finishing plate 62 extending outward from a center thereof, a first upper extension annular protrusion 64 extending upward from the finishing plate 62, and a second upper extension annular protrusion 66 spaced outwardly at a predetermined distance from the first upper extension annular protrusion 64 and extending upward, wherein the finishing plate 62 is coupled to the outer container 14 while covering one side of the outer container 14, and the first upper extension annular protrusion 64 and the second upper extension annular protrusion 66 come into contact with an inner circumference of the push button 30 to guide the straight reciprocating movement of the push button 30.

The ejection unit 20 is installed inside the shoulder 60, connected to the inner container 12 of the container body 10, and operated by pressing the push button 30 to discharge the liquid contents contained in the inner container 12. The discharge unit 20 is inserted and fixedly coupled between the inner container 12 and the shoulder 60, and has at least a part inserted into the inlet portion 12 of the inner container 12 and connected to the inner container 12 and the remaining part passing through the center of the shoulder 60 and connected to the push button 30. The ejection unit 20 may be preferably a pump for discharging a fixed amount of the liquid content by pumping.

As shown in FIG. 3, the ejection unit 20 may include a cylinder 21 inserted into the inlet portion of the inner container 12 and formed in a lower part thereof with a suction port 21*a*, a contents suction tube 22 content extending from the content suction port 21*a* and inserted into the inner container 12, a suction valve plate 23 for opening/closing the content suction port 21*a* of the cylinder 21, a sealing cap 24 coupled to an upper part of the cylinder 21 while surrounding the cylinder 21, a stem 25 reciprocating in a pumping operation direction while passing through the sealing cap 24, an elastic spring 26 for elastically supporting an operation discharge tube 27 coupled to the stem 25 and reciprocating together, and an operation discharge ring 28 fitted to an outer side of the operation discharge tube 27 to come into close contact with an inner circumference of the cylinder 21.

Meanwhile, a sealing ring 29 may be further provided between the cylinder 21 of the ejection unit 20 and the inner container 12 to increase the sealing force of the inner container 12. The sealing ring 29 is formed of an elastic material to further improve the sealing force of the inner container 12, preferably formed of at least one of urethane rubber, natural rubber, elastomer, nitrile-butadiene rubber (NBR) and silicone, or elastic polypropylene, polyethylene, or acrylonitrile butadiene styrene (ABS), and particularly, most preferably formed of thermoplastic elastomer (TPE) as a material between rubber and plastic with softness and excellent durability.

The push button 30 may be connected to one side of the ejection unit 20 to operate the ejection unit 20 while reciprocating vertically when being pressed by the user, and may reciprocate for a predetermined distance while coming into contact with outer circumferences of the first upper extension annular protrusion 64 and the second upper extension annular protrusion 66 of the shoulder 60.

An ejection path 32 is formed inside the press button 30, in which one end of the ejection path 32 is connected to the ejection unit 20, and an opposite end is connected to the nozzle 40. The ejection path 32 serves as a passage through which the liquid contents discharged by the ejection unit 20 passes and as a space into which the nozzle 40 and the nozzle blocking unit 50 are inserted, and may extend vertically for a predetermined section from a center bottom of the push button 30 and extend horizontally across the inner space of the push button 30 from a predetermined one point. Meanwhile, the push button 30 may be formed in a dual structure of an inner button 34 and an outer button 36, in which the ejection path 32 may be formed in the inner button 34.

The nozzle 40 is coupled to one side of the push button 30 and protrudes outward from the push button 30. As shown in FIG. 2, the nozzle 40 is formed in a tubular shape with a hollow inside, and has at least a part inserted into the press button 30 and connected to the ejection path 32, and an opposite part formed with a discharge port 42 to discharge the liquid contents passing through the ejection path 32 to the outside.

The nozzle 40 extends in the same direction as the ejection path 32 for smooth discharge and usability of the liquid contents, and a nozzle blocking unit 50 may be inserted into the inner space of the nozzle. In other words, the nozzle 40 is fixedly coupled to the one end of the ejection path 32 to have a part inserted into the ejection path 32 of the push button 30 and the remaining part protruding outward from the push button 30.

Meanwhile, a locking step 44 is formed on an inner circumference of the nozzle 40 so that at least a part of the nozzle valve 54 is locked on the locking step 44. The locking step 44 has a ring shape extending along the inner circumference of the nozzle 40, and may partially reduce an inner diameter of the nozzle 40 and may be adjacent to the discharge port 42. In other words, the locking step 44 protrudes inward from the nozzle 40 to restrict the nozzle valve 54 from being completely inserted into the inner space of the nozzle 40 from the outside while being pulled by the elastic body 52, and accordingly, the nozzle valve 54 opens or closes the discharge port 42 of the nozzle 40 from the outside.

The nozzle blocking unit 50 is formed inside the nozzle 40 to open or close the discharge port 42 of the nozzle 40 while being elastically deformed by the discharge pressure of the liquid contents.

The nozzle blocking unit 50 may include the elastic body 52 and the nozzle valve 54 coupled to the elastic body 52 and reciprocating to open and close the discharge port 42. When the elastic body 52 extends from the inside of the nozzle 40 toward the discharge port 42, the nozzle valve 54 is spaced apart from the discharge port 42 to open the discharge port 42, and when the elastic body 52 is restored, the nozzle valve 54 covers the discharge port 42 from the outside to close the discharge port 42.

As shown in FIG. 3, the elastic body 52 may include a locking portion **52*a*, an elastic portion 52*b* extending from the locking portion 52*a* and elastically deformed, and a coupling portion 52*c* formed at an end of the elastic portion 52*b* and coupled to the nozzle valve 54**.

The locking portion **52*a* may be formed at one end of the elastic body 52 to serve as a fixed axis of the elastic body 52 elastically deformed inside the nozzle 40. The locking portion 52*a* is formed in a ring shape to allow the liquid contents to pass through a center thereof, and has a diameter relatively larger than the inner diameter of the nozzle 40 so as to be locked and fixed to one end of the nozzle 40, that is, the end of the nozzle 40 inserted into the ejection path 32, and the elastic body 52 is elastically stretched toward the discharge port 42 of the nozzle 40 with respect to the locking portion 52*a*** when the discharge pressure of the liquid contents is generated.

The elastic portion **52*b* refers to a portion tensioned (a phenomenon in which an object is stretched when a force acts in an outward direction parallel to a central axis of the object) by the discharge pressure of the liquid contents or restored by its own elastic force, and connects the locking portion 52*a* to the coupling portion 52*c* to allow the liquid contents to move through an inner space thereof. The elastic portion 52*b* may preferably have a cylindrical screw shape in which at least one line is wound in parallel at predetermined angle around an imaginary axis passing through the locking portion 52*a* and the coupling portion 52*c***.

The coupling portion **52*c* may include a coupling ring 52*c*-1 and at least one connecting rib 52*c*-2 for connecting the coupling ring 52*c*-1 to the elastic portion 52*b* at a predetermined interval. The coupling ring 52*c*-1 is formed in a center thereof a hole into which the nozzle valve 54 is fitted, and the liquid contents move along the center of the locking portion 52*a* and the inner space of the elastic portion 52*b*, and then pass through a space between the connecting rib 52*c*-2. The coupling portion 52*c* has an outer diameter relatively smaller than the inner diameter of the nozzle 40, so that the liquid contents move into a gap between the nozzle 40 and the coupling portion 52*c***.

Meanwhile, the elastic body 52 refers to an injection spring formed of synthetic resin and may be preferably installed in the inner space of the nozzle 40.

As shown in FIG. 2, the nozzle valve 54 has at least a part locked by the locking step 44 of the nozzle 40 so as to be exposed to the outside of the nozzle 40 and simultaneously opens and closes the discharge port 42 of the nozzle 40 from the outside. The nozzle valve 54 may include a central shaft **54*a* inserted into the inner space of the nozzle 40 so as to be coupled to the elastic body 52, and a valve plate 54*b* extending outward from the central shaft 54*a* to block the discharge port 42 of the nozzle 40 or open and close the discharge port 42 while being spaced apart from the discharge port 42. The central shaft 54*a* is fitted into the coupling ring 52*c*-1 while passing through the hole formed in the center of the coupling ring 52*c*-1 of the elastic body 52, and the valve plate 54*b* is formed in a disk shape and comes into contact with one surface of the locking step 44 of the nozzle 40. For smooth opening and closing of the discharge port 42, the valve plate 54*b* may preferably have an outer diameter relatively smaller than the inner diameter of the nozzle 40 and relatively larger than the inner diameter of the locking step 44**.

As described above, in the liquid contents ejection container having a nozzle blocking structure according to the embodiments of the present disclosure, the nozzle valve 54 coupled to the elastic body 52 opens and closes the discharge port 42 of the nozzle 40 from the outside while the elastic body 52 is stretched and then restored by the discharge pressure of the liquid contents, so that sealing inside the nozzle 40 can be stably maintained, and a restoring force can be prevented from being deteriorated due to repeated compression of the elastic body 52.

Figure 4:
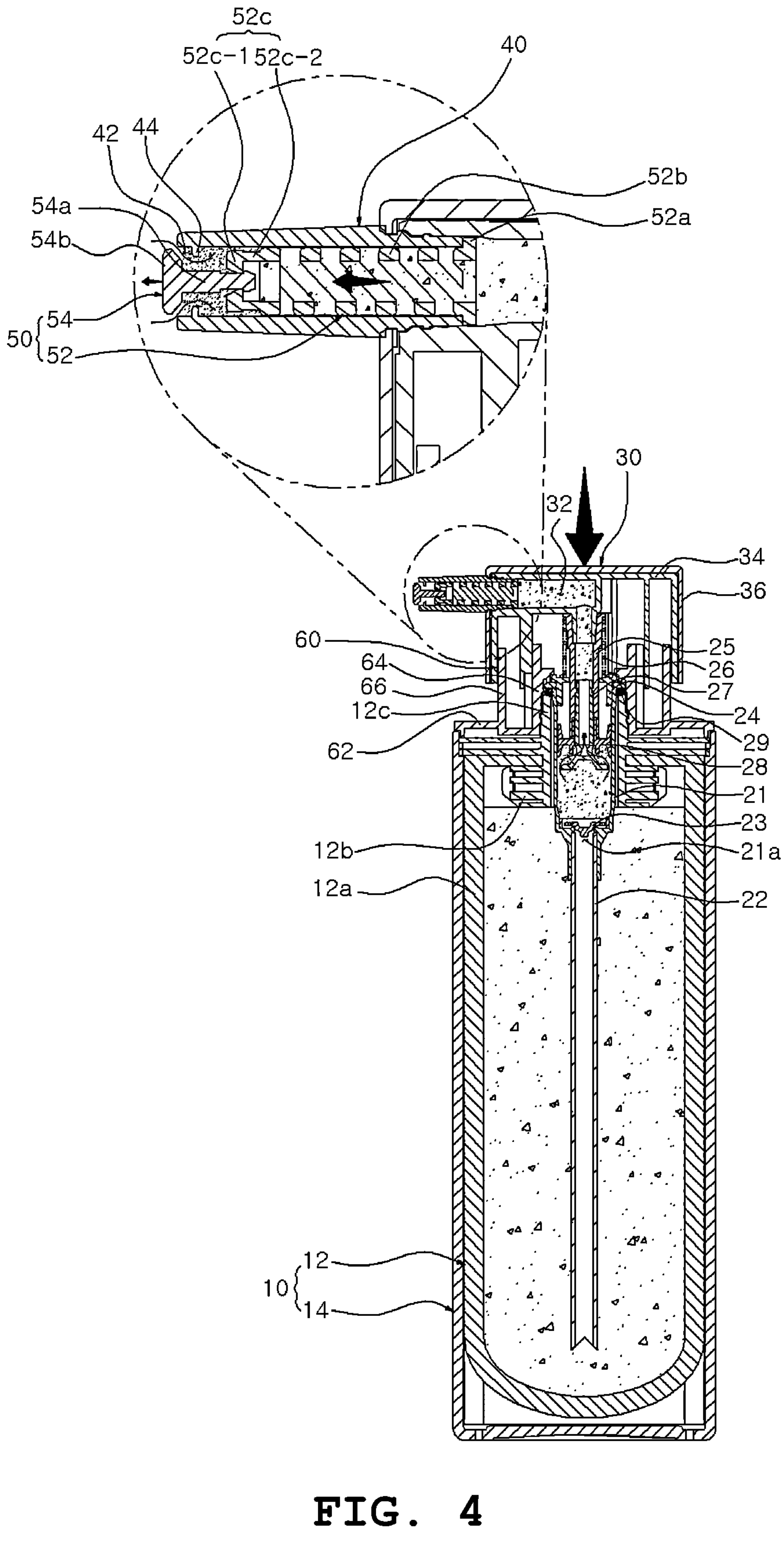
FIG. 4 is a sectional view illustrating a state in which a push button is pressed according to the embodiments of one aspect of the present disclosure.
Figure 5:
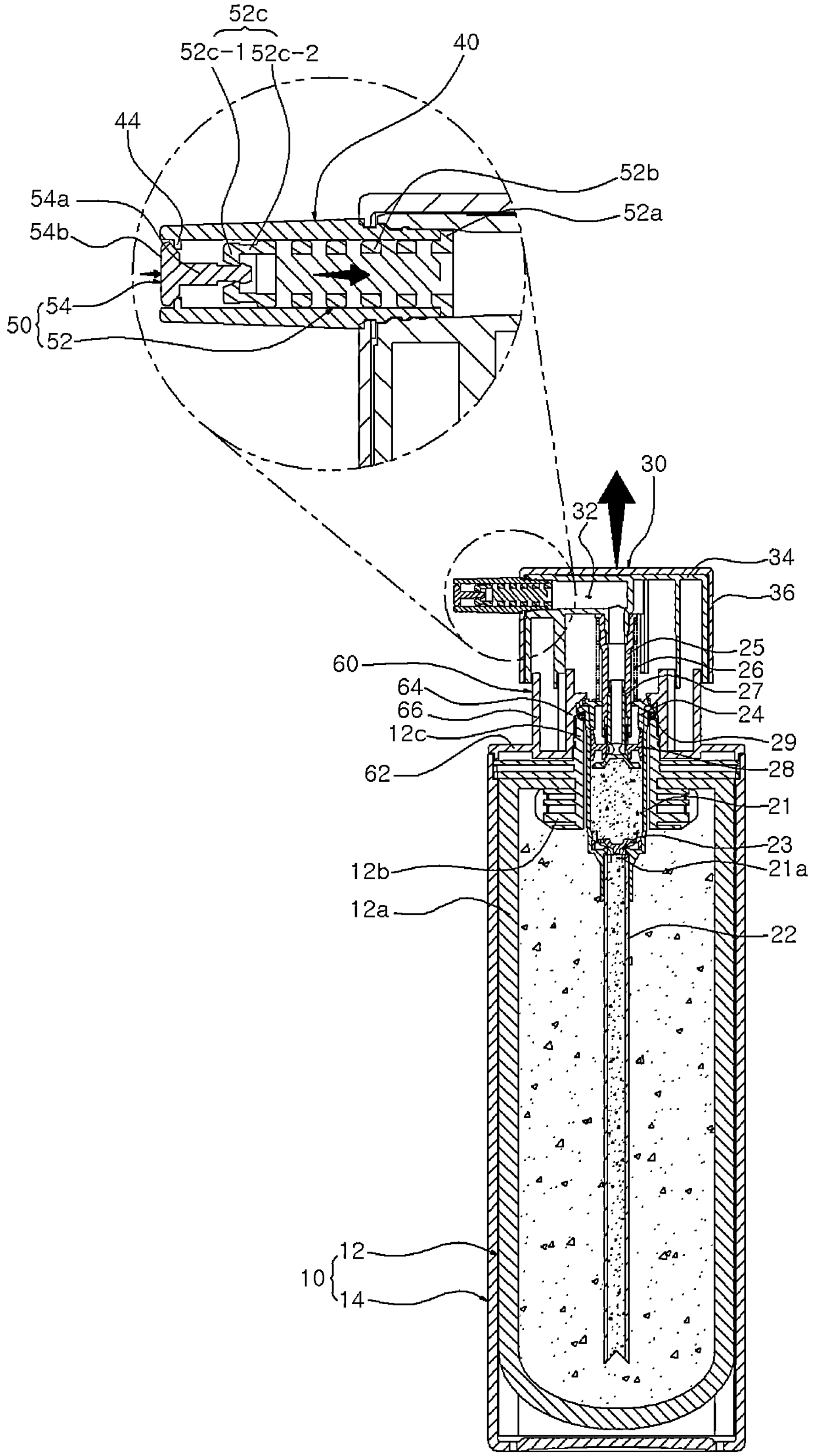
FIG. 5 is a sectional view illustrating a state in which the pressure of the push button is released according to the embodiments of one aspect of the present disclosure.

FIGS. 4 and 5 are views illustrating the operation of the liquid contents ejection container according to the embodiments of the present disclosure. An operation process of the liquid contents ejection container having the nozzle blocking structure according to the embodiments of the present disclosure will be described with reference to the above drawings.

FIG. 4 is a sectional view illustrating a state in which a push button is pressed according to the embodiments of the present disclosure, and FIG. 5 is a sectional view illustrating a state in which the pressure of the push button is released according to the embodiments of the present disclosure.

In order to use the liquid contents ejection container having the nozzle blocking structure according to the embodiments of the present disclosure, the push button 30 is pressed to operate the ejection unit 20 as shown in FIG. 4. When the push button 30 is pressed, the stem 25 and the operation discharge tube 27 of the ejection unit 20 coupled to the push button 30 move downward together. Because the operation discharge ring 28 comes into close contact with the inner surface of the cylinder 21, only the operation discharge tube 27 moves downward to generate a gap between the operation discharge tube 27 and the operation discharge ring 28, thereby generating a passage for the contents. When the push button 30 is further pushed, a lower end of the stem 25 moving downward by the press button 30 presses the operation discharge ring 28, and accordingly, the operation discharge ring 28 moves downward together with the operation discharge tube 27, thereby, decreasing the volume inside the cylinder 21. Accordingly, the suction valve plate 23 closes the content suction port 21*a* due to the discharge pressure in the cylinder 21, and the liquid contents stored in the cylinder 21 come out between the operation discharge tube 27 and the operation discharge ring 28 and moves into inner paths of the operation discharge tube 27 and the stem 25.

Continuously, as shown in the partially enlarged view of FIG. 4, the liquid contents discharged from the ejection unit 20 are introduced into the inner space of the elastic body 52 through the ejection path 32 of the push button 30, the elastic portion 52*b* of the elastic body 52 is stretched outward around the locking portion 52*a* due to the discharge pressure of the liquid contents introduced into the inner space of the elastic body 52, and the nozzle valve 54 coupled to the elastic body 52 is separated from the locking step 44 of the nozzle 40 to open the discharge port 42, thereby discharging the liquid contents to the outside through the discharge port 42.

Thereafter, when the pressure of the push button 30 is released as shown in FIG. 5, the stem 25 moves upward while the elastic spring 26 elastically supporting the stem 25 of the ejection unit 20 is restored to an initial shape, and the operation discharge tube 27 coupled to the lower side of the stem 25 also moves upward. The lower part of the operation discharge tube 27 pulls the operation discharge ring 28 upward to close the gap between the operation discharge tube 27 and the operation discharge ring 28, so that the operation discharge tube 27 and the operation discharge ring 28 move upward together, and thus the volume inside the cylinder 21 increases, thereby generating a vacuum pressure. At the same time, the suction valve plate 23 is lifted by the vacuum pressure generated in the cylinder 21 to open the contents suction port 21*a* formed on the e bottom of the cylinder 21, the liquid contents contained in the inner container 12 are introduced into the cylinder 21 through the content suction tube 22 and the content suction port 21*a*, and the inner container 12 is distorted by the amount of discharged liquid contents.

As shown in the enlarged view of FIG. 5, the elastic portion 52*b* of the elastic body 52 is restored by its own elastic force as the discharge pressure of the liquid contents disappears, and the nozzle valve 54 coupled to the elastic body 52 closes the discharge port 42 when the nozzle valve is locked on the locking step 44 of the nozzle 40.

The one aspect of the present disclosure has been described with reference to limited embodiments, drawings, and particular items such as specific components, it will be understood that the above description has been merely provided for further understanding the invention, and the present disclosure is not limited to the embodiments. It will be understood by those skilled in the art that various modifications and deformations may be carried out. Therefore, the idea of the present disclosure will not be determined by the aforementioned embodiments only, and the following claims as well as all modifications or variations belonging to the equivalents of the claims are within the scope of the present disclosure.

DESCRIPTION OF REFERENCE NUMERALS

10: Container body
12: Inner container
14: Outer container
20: Ejection unit
32: Ejection path
36: Outer button
42: Discharge port
50: Nozzle blocking unit
52*a*: Locking portion
52*c*: Coupling portion
54*a*: Central shaft
60: Shoulder
30: Push button
34: Inner button
40: Nozzle
44: Locking step
52: Elastic body
52*b*: Elastic portion
54: Nozzle valve
54*b*: Valve plate

The invention claimed is:

1. A liquid contents ejection container having a nozzle blocking structure, the liquid contents ejection container comprising:

a container body in which liquid contents are stored;

an ejection unit connected to the container body to eject the liquid contents;

a push button connected to the ejection unit to operate the ejection unit, and formed therein with an ejection path;

a nozzle coupled to one side of the push button and having an ejection hole; and a nozzle blocking unit composed of an elastic body formed inside the nozzle and elastically deformed, and a nozzle valve for opening/closing the ejection hole while being reciprocated by the elastic body, wherein the nozzle valve is spaced apart from the ejection hole to open the ejection hole while the elastic body is stretched outward from the inside of the nozzle, and the nozzle valve covers the ejection hole on an outer side thereof to close the ejection hole while the elastic body is restored, wherein the elastic body includes a locking portion, an elastic portion extending from the locking portion and elastically deformed, and a coupling portion formed at an end of the elastic portion and coupled to the nozzle valve, wherein the coupling portion includes a coupling ring formed at a center thereof with a hole to which the nozzle valve is coupled, and at least two connecting ribs for connecting the coupling ring to the elastic portion at a predetermined interval, wherein the liquid contents move along a center of the locking portion and an inner space of the elastic portion, and then pass through a space between the connecting ribs, and wherein the coupling portion has an outer diameter smaller than the inner diameter of the nozzle, so that the liquid contents move into a gap between the nozzle and the coupling portion.

2. The liquid contents ejection container of claim 1, wherein the container body includes an inner container for containing the liquid contents therein and an outer container for surrounding an outer side of the inner container.

3. The liquid contents ejection container of claim 1, wherein the container body has one side further coupled to a shoulder to which a push button is straight movably coupled.

4. The liquid contents ejection container of claim 1, wherein the ejection unit includes a pump for pumping the liquid contents stored in the container body.

5. The liquid contents ejection container of claim 1, wherein the nozzle has an inner circumference from which a locking step protrudes, and at least a part of the nozzle valve is locked by the locking step, so that the nozzle valve opens and closes a discharge port of the nozzle from an outside.

6. The liquid contents ejection container of claim 1, wherein the locking portion has a ring shape and is locked and fixed to one end of the nozzle.

7. The liquid contents ejection container of claim 1, wherein the elastic portion has a cylindrical screw shape in which at least one line is wound in parallel at predetermined angle around an imaginary axis passing through the locking portion and the coupling portion.

8. The liquid contents ejection container of claim 1, wherein the nozzle valve includes a central shaft inserted into an inner space of the nozzle so as to be coupled to the elastic body, and a valve plate extending outward from the central shaft to open and close a discharge port of the nozzle.

* * * * *